United States Patent [19]

Hagiwara et al.

[11] Patent Number: 5,048,345
[45] Date of Patent: Sep. 17, 1991

[54] METHOD OF DETERMINING POSITIONS OF BEADS

[75] Inventors: Ichiro Hagiwara; Masaaki Tsuda, both of Kamakura; Yuichi Kitagawa, Yokosuka; Tatsuya Futamata, Atsugi, all of Japan

[73] Assignee: Nissan Motor Co., Ltd., Yokohama, Japan

[21] Appl. No.: 561,998

[22] Filed: Aug. 2, 1990

[30] Foreign Application Priority Data

Aug. 3, 1989 [JP] Japan .................................. 1-200264
Sep. 7, 1989 [JP] Japan .................................. 1-230315

[51] Int. Cl.$^5$ .............................................. G01N 3/00
[52] U.S. Cl. ...................................... 73/788; 29/897.2
[58] Field of Search .................. 73/788, 821; 29/897.2

[56] References Cited

U.S. PATENT DOCUMENTS 3,577,621  5/1971  DeGain .............................. 29/897.2

Primary Examiner—Jerry W. Myracle
Attorney, Agent, or Firm—Foley & Lardner

[57] ABSTRACT

A method of determining the positions of beads, capable of determining appropriate positions easily. The method includes the steps of obtaining a buckling waveform on the member without any bead; analyzing the obtained buckling waveform to determine concave portions and convex portions of the buckling waveform; and determining the positions of the beads in accordance with the concave portions and the convex portions of the buckling waveform.

8 Claims, 9 Drawing Sheets

—— WITH BEADS (AXIAL CRUSHING MODE)
------ WITHOUT BEAD (CRACKING MODE)

— WITH BEADS (AXIAL CRUSHING MODE)
---- WITHOUT BEAD (CRACKING MODE)

| BEAD TYPE | PROMOTING DEFORMATION | PEAK LOAD REDUCTION RATE | REMARK |
|---|---|---|---|
| EDGE BEAD | CONCAVE DEFORMATION | APPROXIMATELY 16% | EFFECTIVE IN INDUCING CRUSHING |
| CONCAVE SIDE FACE BEAD | CONCAVE DEFORMATION | APPROXIMATELY 14% | EFFECTIVE IN PROMOTING CRUSHING |
| CONVEX SIDE FACE BEAD | CONVEX DEFORMATION | APPROXIMATELY 14% | EFFECTIVE IN PROMOTING CRUSHING |

METHOD OF DETERMINING POSITIONS OF BEADS

BACKGROUND OF THE INVENTION

1. Field of the Invention

The present invention relates to a method of determining positions of beads on a member to be subjected to a crushing load.

2. Description of the Background Art

In an automobile, for the purpose of protection of a passenger, members of a car body are equipped with beads for absorbing an energy due to a crushing load exerted to them externally.

Such beads can be positioned in various different manners. For example, for a side member 103 inside an engine room 101 of a car 100 shown in FIGS. 1 and 2, beads 105 may be provided on edges as shown in FIG. 3(A), on side faces as shown in FIG. 3(B), or on both of these as shown in FIG. 3(C). In each of these cases, when the side member 103 is subjected to a crushing load in a direction A, the beads 105 function to prevent the side member 103 from bending or cracking, and to absorb an energy due to the crushing load by making the side member 103 to be crushed along the direction A.

Now, conventionally, the positions of such beads have been determined empirically, by performing a number of tests of crushing on the member on which the beads are to be provided. However, such a manner of determining the positions of beads is not only time-consuming and expensive, but also not necessarily reliable despite of all the time and the cost.

SUMMARY OF THE INVENTION

It is therefore an object of the present invention to provide a method of determining the positions of beads, capable of determining appropriate positions easily.

This object is achieved in the present invention by providing a method of determining positions of beads on a member to be subjected to a crushing load, comprising the steps of: obtaining a buckling waveform on the member without any bead; analyzing the obtained buckling waveform to determine concave portions and convex portions of the buckling waveform; and determining the positions of the beads in accordance with the concave portions and the convex portions of the buckling waveform.

Other features and advantages of the present invention will become apparent from the following description taken in conjunction with the accompanying drawings.

DETAILED DESCRIPTION OF THE PREFERRED EMBODIMENTS

Now, the preferred embodiments of a method of determining positions of beads according to the present invention will be described in detail with references to the drawings.

Figure 1:
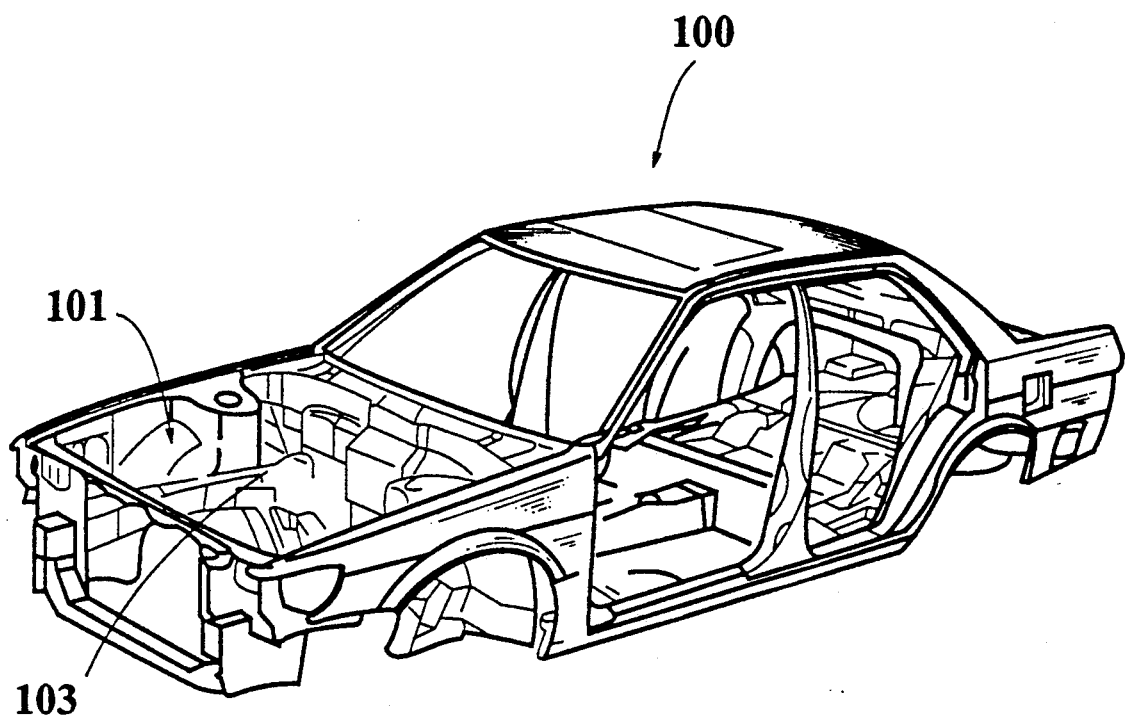
FIGS. 1 and 2 are illustrations of a car body and a side member in an engine room of the car body, to which beads are to be provided.
Figure 2:
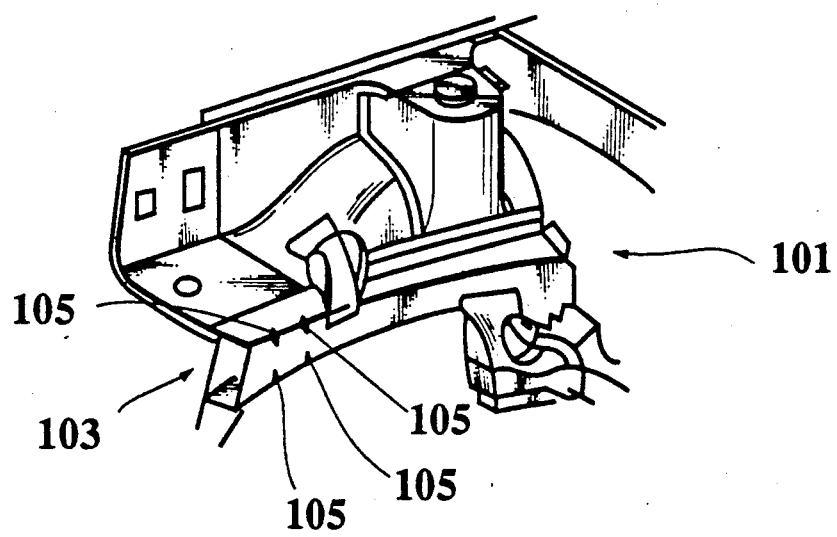
Figure 3:
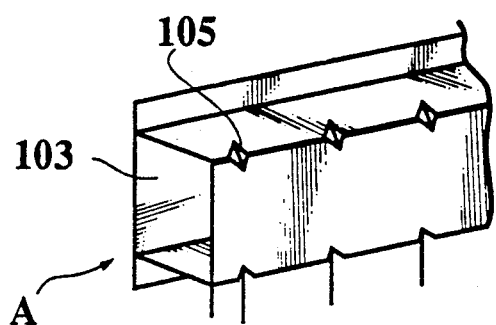
FIGS. 3(A), 3(B), and 3(C) are illustrations of three different types of beads.
Figure 3:
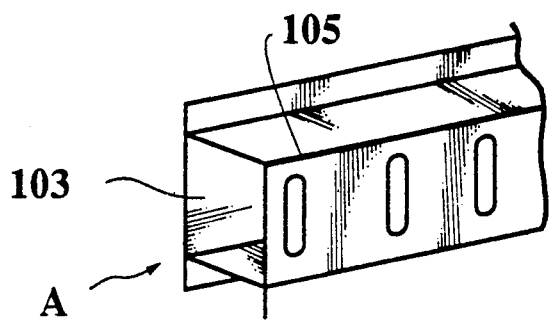
Figure 3:
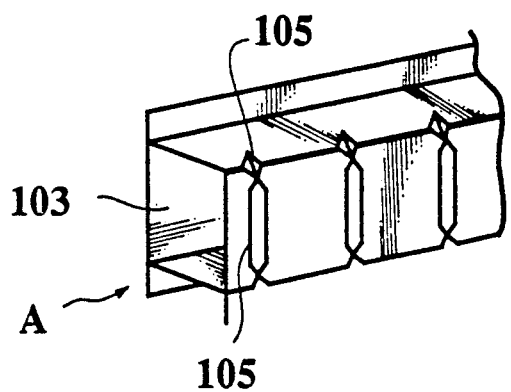
Figure 4:
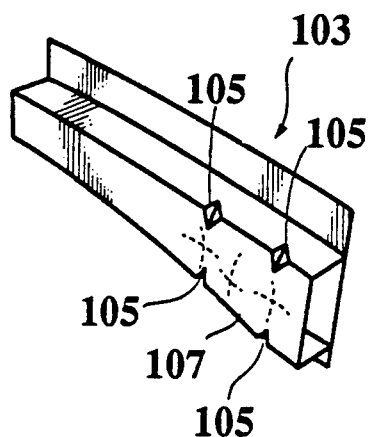
FIGS. 4(A) and 4(B) are illustrations of a member with beads positioned by using the first embodiment of a method of determining the positions of beads according to the present invention, in two different perspectives.
Figure 4:
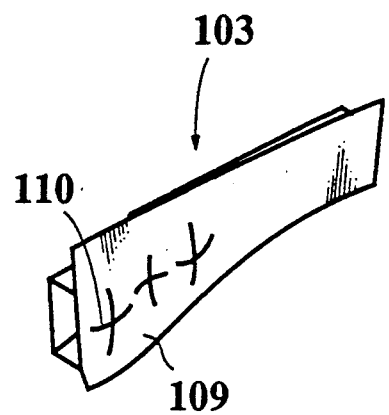

In the first embodiment of a method of determining positions of beads, the beads are arranged such that the side member 103 is lead to an axial crushing mode of high energy absorption, by taking a balance between a crushing pitch of a crushing side face 107 shown in FIG. 4(A) and a crushing pitch of a buckling waveform 110 appearing on the buckling side face 109 shown in FIG. 4(B) which is located at opposite side of the crushing side face 107. This is achieved by itilizing the fact that the beads 105 provided on edges of the side member 103 function to lead the crushing side face 107 to be bent inward, i.e., the beads 105 promote concave deformation of the crushing side face 107, as illustrated in FIG. 4(A). Here, the crushing side face 107 can be considered as a subordinate side face which is deforming in accordance with the crushing mode of the buckling side face 109.

Figure 5:
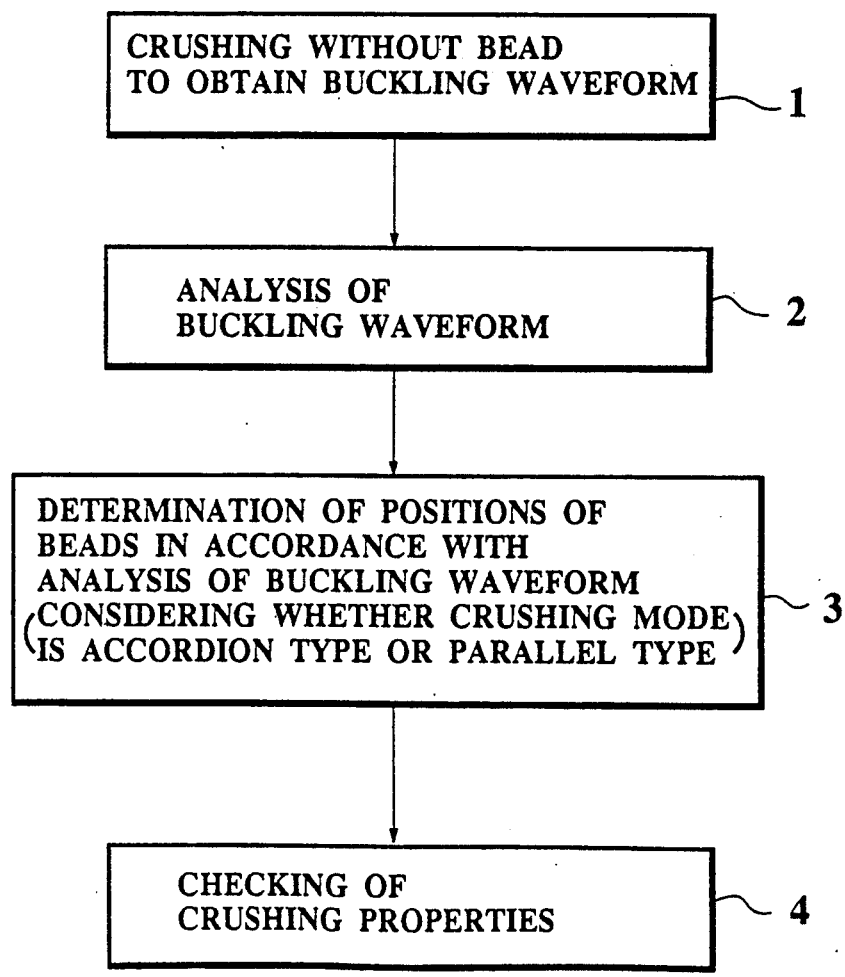
FIG. 5 is a schematic flow chart for the first embodiment of a method of determining the positions of beads according to the present invention.

More specifically, this first embodiment is performed according to the flow chart of FIG. 5, as follows.

Figure 6:
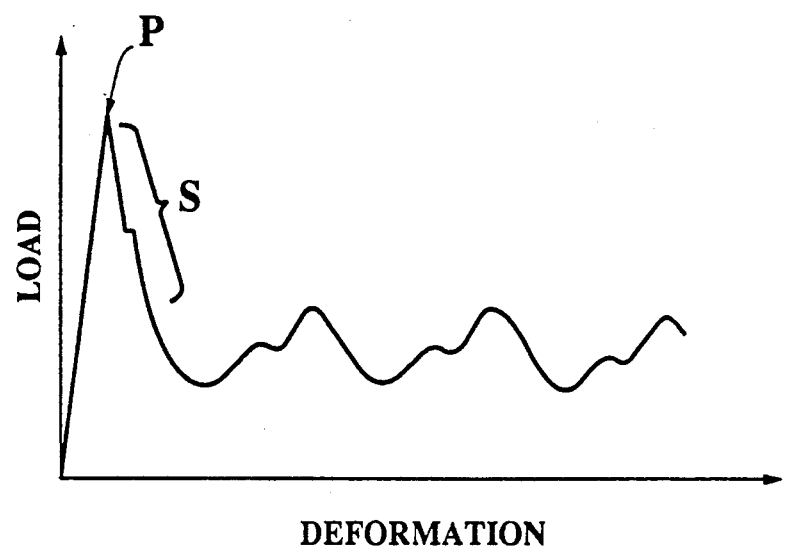
FIG. 6 is a graph of a load to be applied to a side member in the first embodiment, as a function of a deformation.
Figure 7:
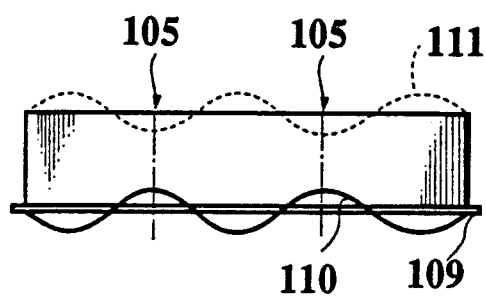
FIGS. 7(A) and 7(B) are illustrations for explaining the determination of the positions of the beads in a case of accordion type crushing mode.
Figure 7:
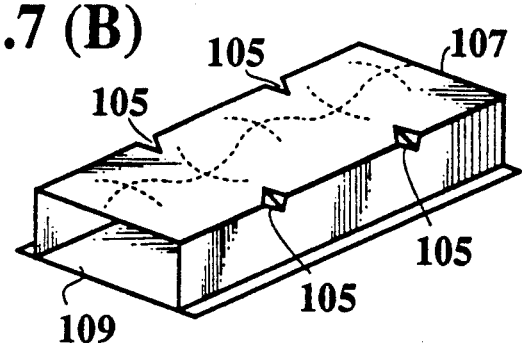
Figure 8:
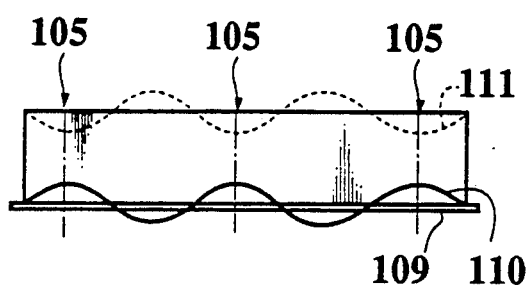
FIGS. 8(A) and 8(B) are another illustrations for explaining the determination of the positions of the beads in a case of accordion type crushing mode.
Figure 8:
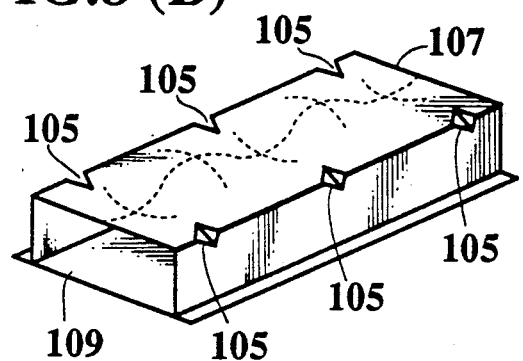

First, at the step 1, the side member 103 without any bead is subjected to a crushing in accordance with a characteristic shown in a graph of FIG. 6. In this crushing, a buckling waveform 110 is produced in a region S immediately following a peak load P, so that the crushing is continued until the occurrence of this buckling waveform 110 on the buckling side face 109 of the side member 103 is checked.

The produced buckling waveform 110 on the buckling side face 109 is then analyzed at the step 2, to determine the concave portions and the convex portions of the buckling waveform 110.

Figure 9:
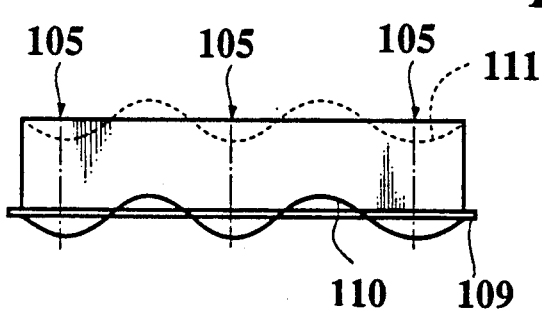
FIGS. 9(A) and 9(B) are illustrations for explaining the determination of the positions of the beads in a case of parallel type crushing mode.
Figure 9:
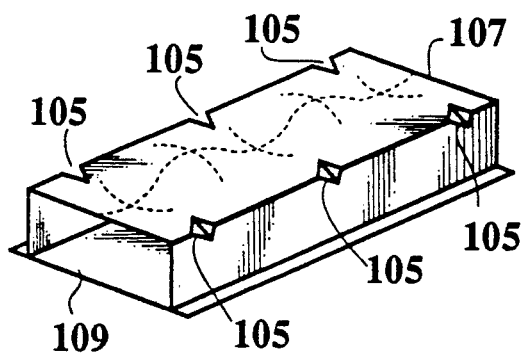
Figure 10:
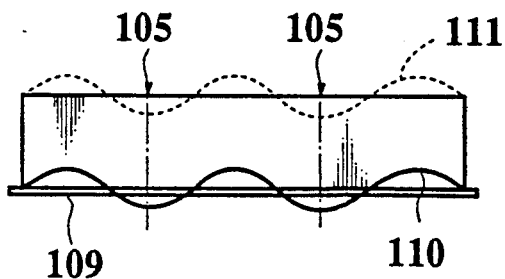
FIGS. 10(A) and 10(B) are another illustrations for explaining the determination of the positions of the beads in a case of parallel type crushing mode.
Figure 10:
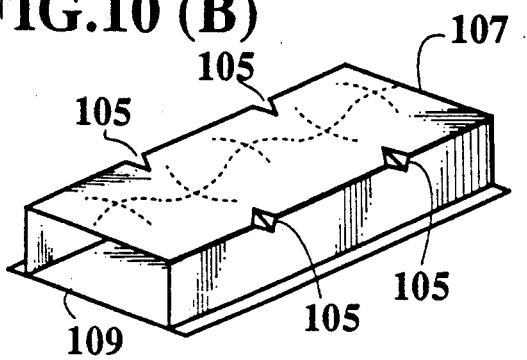

Next, at the step 3, the positions of the beads 105 to be provided on the side member 103 are determined in accordance with this analysis as follows. Namely, when the crushing is in a so called accordion type crushing mode, the beads 105 are to be located at the positions on the crushing side face 107 of the side member 103 which are corresponding to the bottoms of the concave portions of the buckling waveform 110 (seen from a surface of the buckling side face 109) as shown in FIGS. 7(A) and 7(B) or FIGS. 8(A) and 8(B), where dashed lines indicates a crushing mode due to the beads 105. On the other hand, when the crushing is in a so called parallel type crushing mode, the beads 105 are to be located at the positions on the crushing side face 107 of the side member 103 which are corresponding to the tops of the convex portions of the buckling waveform 110 (seen from a surface of the buckling side face 109) as shown in FIGS. 9(A) and 9(B) of FIGS. 10(A) and 10(B), where dashed lines indicates a crushing mode due to the beads 105.

finally, the side member 103 with the beads 105 provided is subjected to a test for checking the crushing mode and other crushing properties at the step 4.

Figure 11:
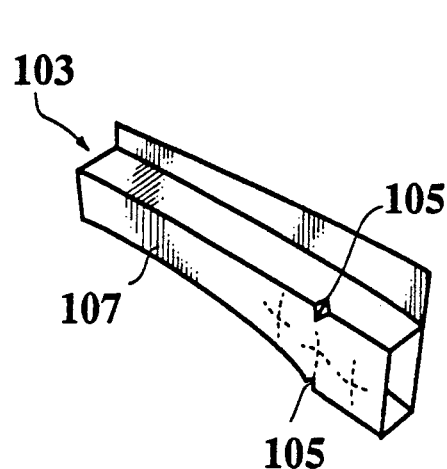
FIGS. 11(A), 11(B), and 11(C) are illustrations of a side member with the beads positioned by using the first embodiment for accordion type crushing mode, in three different perspectives.
Figure 11:
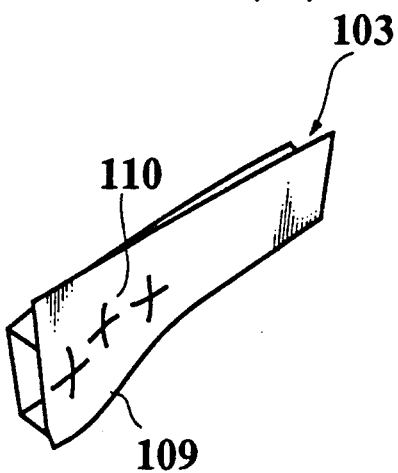
Figure 11:
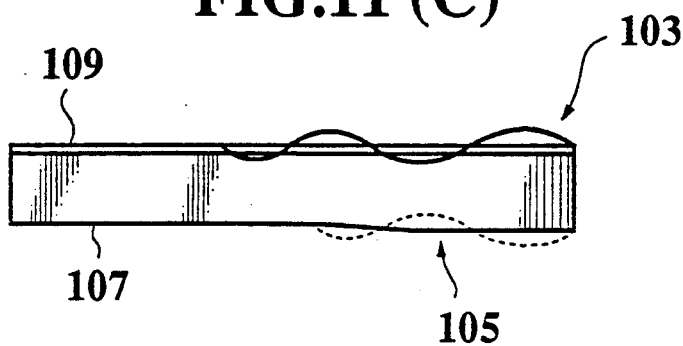
Figure 12:
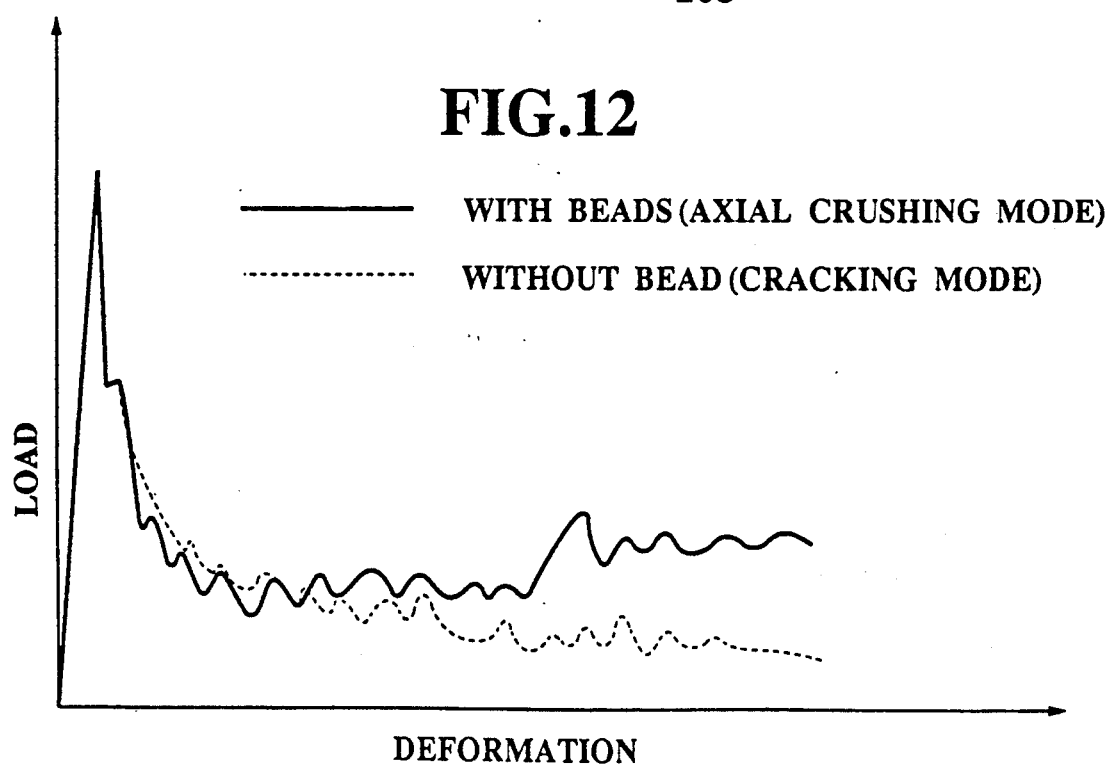
FIG. 12 is a graph of a load as a function of a deformation for the side member shown in FIGS. 11(A), 11(B) and 11(C).

An example of the side member 103 with the beads 105 positioned by using this embodiment is shown in FIGS. 11(A), 11(B), and 11(C), for the case of the accordion type crushing mode. As can be seen from FIG. 11(C), the side member 103 is lead to the axial crushing mode by means of the beads 105. In this case, an amount of load as a function of an amount of deformation has been obtained for a case with the beads 105 (axial crushing mode) and for a case without the beads 105 (cracking mode), as shown in FIG. 12, which demonstrates that the energy due to the crushing load is absorbed more effectively with the beads 105.

Figure 13:
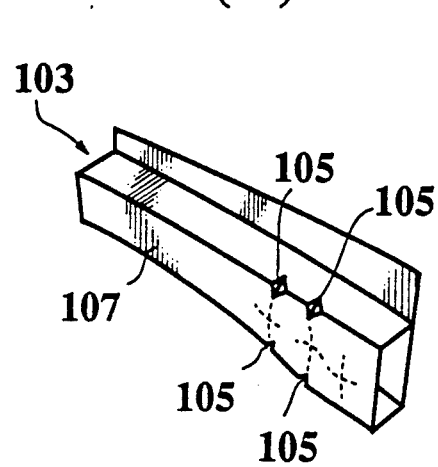
FIGS. 13(A), 13(B), and 13(C) are illustrations of a side member with the beads positioned by using the first embodiment for parallel type crushing mode, in three different perspectives.
Figure 13:
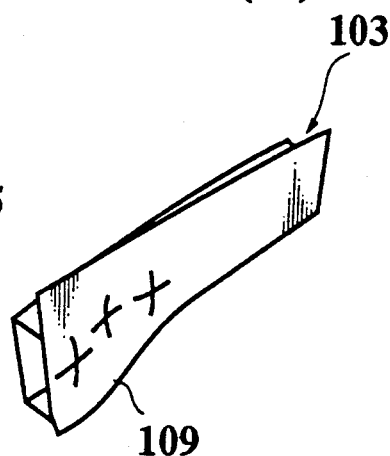
Figure 13:
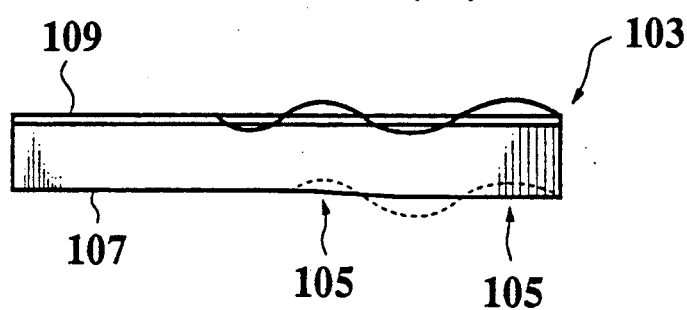
Figure 14:
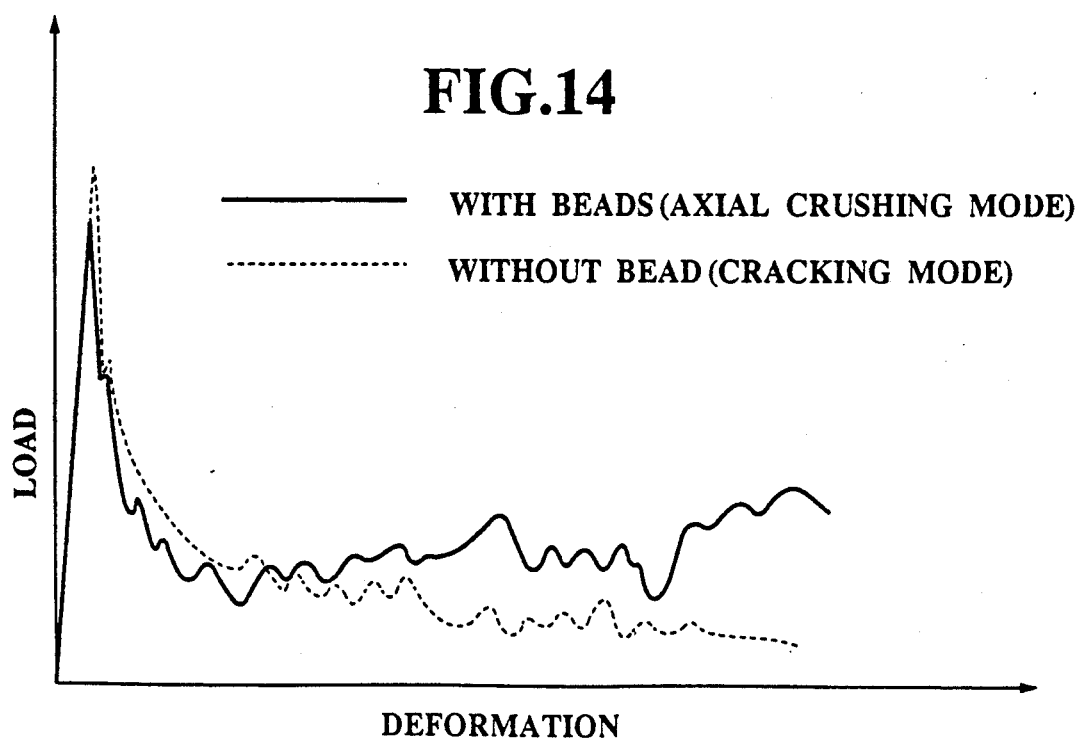
FIG. 14 is a graph of a load as a function of a deformation for the side member shown in FIGS. 13(A), 13(B) and 13(C).

Another example of the side member 103 with the beads 105 positioned by using this embodiment is shown in FIGS. 13(A), 13(B), and 13(C), for the case of the parallel type crushing mode. As can be seen from FIG. 13(C), the side member 103 is lead to the axial crushing mode by means of the beads 105. In this case, an amount of load as a function of an amount of deformation has been obtained for a case with the beads 105 (axial crushing mode) and for a case without the beads 105 (cracking mode), as shown in FIG. 14, which demonstrates that the energy due to the crushing load is absorbed more effectively with the beads 105.

Thus, according to this first embodiment, it is possible to determine the positions of the beads very easily, quickly, and accurately, because the positions of the beads are determined in accordance with the buckling waveform due to the crushing.

Next, the second embodiment of a method of determining the positions of beads according to the present invention will be described.

Figures 15, 16:
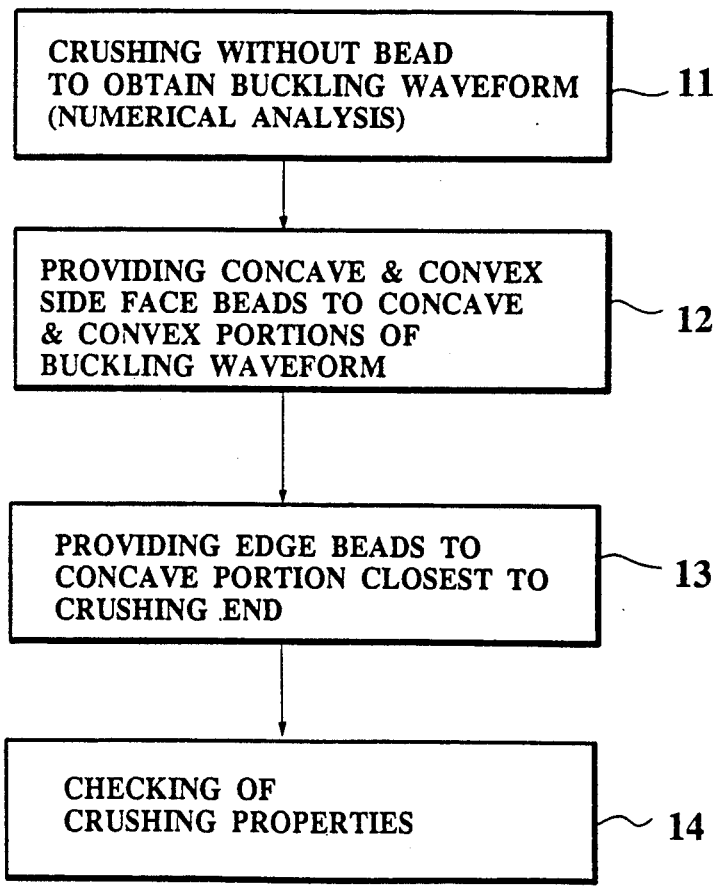
FIG. 15 is a table summarizing properties of the different types of beads.
FIG. 16 is a schematic flow chart for the second embodiment of a method of determining the positions of beads according to the present invention.

In the second embodiment, the beads are arranged by considering the facts summarized in the table of FIG. 15, which indicate that the edge beads are effective in reducing the load, while the convex and concave side face beads are effective in promoting the convex and concave deformations of the side face, respectively.

More specifically, this second embodiment is performed according to the flow chart of FIG. 16, as follows.

Figure 17:
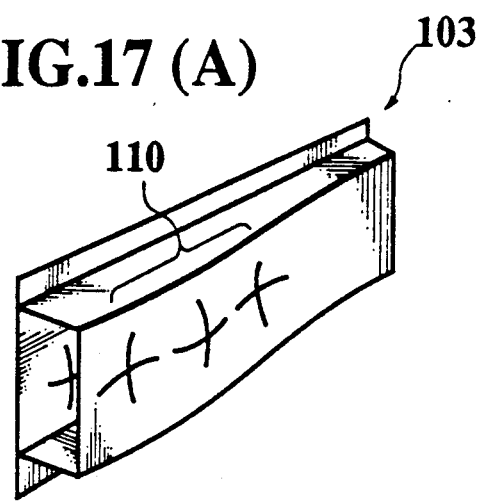
FIGS. 17(A), 17(B), and 17(C) are sequential illustrations of a member with beads positioned by using the second embodiment, in three different stages.
Figure 17:
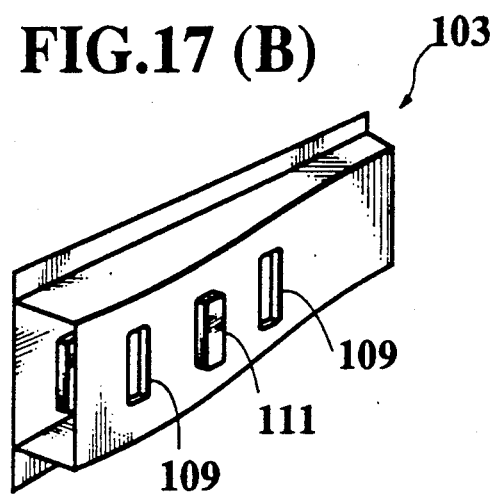
Figure 17:
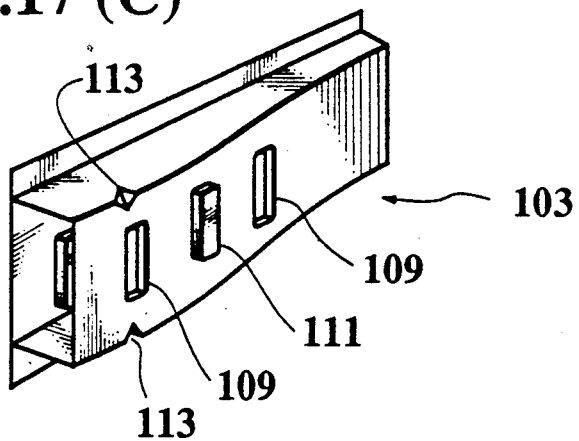

First, at the step 11, the buckling waveform 110 on the side member 103 without any bead is obtained, as shown in FIG. 17(A), by a numerical analysis using a finite elements method, which can be performed on a computer in a known procedure.

Then, at the step 12, the concave side face beads 109 are positioned at the concave portions of the buckling waveform 110, while the convex side face beads 111 are positioned at the convex portions of the buckling waveform 110, as shown in FIG. 17(B).

Then, at the step 13, the edge beads 113 are provided at the positions corresponding to the concave portion of the buckling waveform 110 which is closest to the crushing end, as shown in FIG. 17(C).

By arranging the concave side face beads 109, convex side face beads 111, and edge beads 113 in this manner, the maximum load can be reduced while the axial crushing mode of the side member 103 is continually promoted by maintaining the average crushing load.

Finally, the side member 103 with the beads 109, 111, and 113 provided is subjected to a test for checking the crushing mode and other crushing properties at the step 14.

Figure 18:
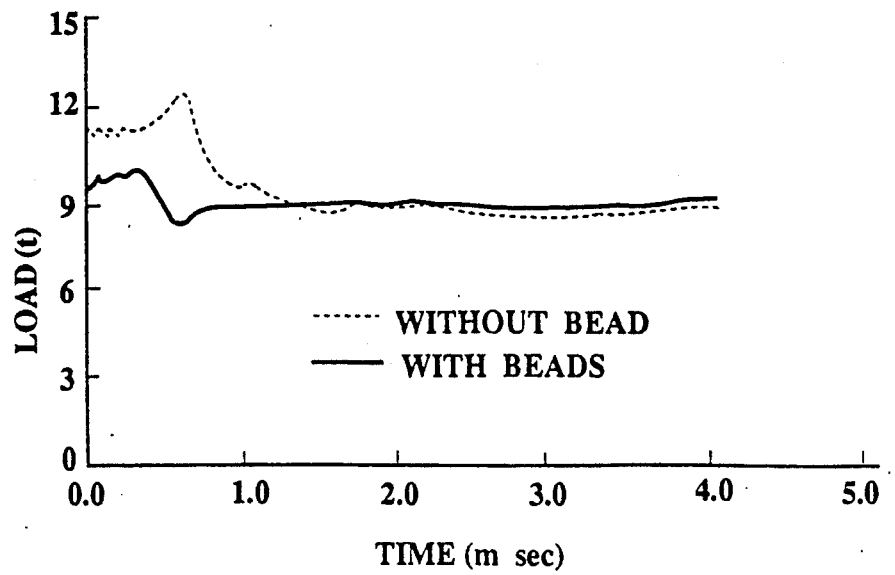
FIG. 18 is a graph of a load as a function of time for the side member shown in FIGS. 17(C).

In this case, an amount of load as a function of time with and without the beads 109, 111, and 113 have been obtained as shown in FIG. 18, which demonstrates that the maximum load can be suppressed more with the beads 109, 111, and 113, than without any bead, so that the transition to the crushing in the axial direction becomes smoother.

Thus, according to this second embodiment, it is possible to determine the positions of the beads very easily, quickly, and accurately, because the positions of the beads are determined in accordance with the buckling waveform due to the crushing, which can be obtained by a numerical analysis performed on a computer.

What is claimed is:

1. A method of determining positions of beads on a member to be subjected to a crushing load, comprising the steps of:
    obtaining a buckling waveform on the member without any bead;
    analyzing the obtained buckling waveform to determine concave portions and convex portions of the buckling waveform; and
    determining the positions of the beads in accordance with the concave portions and the convex portions of the buckling waveform.

2. The method of claim 1, wherein at the obtaining step, the buckling waveform is obtained by applying the crushing load at least until a peak load is applied.

3. The method of claim 1, wherein at the obtaining step, the buckling waveform is obtained by a numerical analysis performed on a computer.

4. The method of claim 1, wherein at the determining step, the beads are positioned on a subordinate side face of the member which deforms in accordance with a crushing mode of a side face on which the buckling waveform is present.

5. The method of claim 4, wherein at the determining step, the beads are positioned at positions on the subordinate side face which correspond to bottoms of the concave portions of the buckling waveform, in a case the crushing mode is accordion type.

6. The method of claim 4, wherein at the determining step, the beads are positioned at positions on the subordinate side face which correspond to tops of the convex portions of the buckling waveform, in a case the crushing mode is parallel type.

7. The method of claim 1, wherein at the determining step, concave side face beads are positioned at the concave portions of the buckling waveform, and convex side face beads are positioned at the convex portions of the buckling waveform.

8. The method of claim 7, wherein at the determining step, edge beads are also positioned at the concave portions closest to a crushing end of the member to which the crushing load is to be exerted.

* * * * *